US006825806B2

(12) United States Patent
Liu et al.

(10) Patent No.: US 6,825,806 B2
(45) Date of Patent: Nov. 30, 2004

(54) SATELLITE METHODS AND STRUCTURES FOR IMPROVED ANTENNA POINTING AND WIDE FIELD-OF-VIEW ATTITUDE ACQUISITION

(75) Inventors: Ketao Liu, Cerritos, CA (US); Richard Fowell, Rolling Hills Estates, CA (US); Yeong-Wei A. Wu, Rancho Palos Verdes, CA (US); Rongsheng Li, Hacienda Heights, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/162,465

(22) Filed: Jun. 3, 2002

(65) Prior Publication Data

US 2003/0222816 A1 Dec. 4, 2003

(51) Int. Cl.[7] .......................... H01Q 3/00; H04B 7/185
(52) U.S. Cl. ....................... 342/359; 342/354; 342/355; 342/358
(58) Field of Search ................................ 342/359, 354, 342/355, 358

(56) References Cited

U.S. PATENT DOCUMENTS

| | | | | |
|---|---|---|---|---|
| 3,060,425 A | | 10/1962 | Cutler et al. | |
| 4,599,619 A | | 7/1986 | Keigler et al. | 343/352 |
| 4,630,058 A | | 12/1986 | Brown | 342/359 |
| 4,910,524 A | | 3/1990 | Young et al. | 342/354 |
| 5,062,592 A | * | 11/1991 | Kishimoto | 342/355 |
| 5,408,237 A | * | 4/1995 | Patterson et al. | 342/354 |
| 5,597,142 A | | 1/1997 | Leung | 244/164 |
| 5,697,050 A | | 12/1997 | Wiedeman | |
| 5,758,260 A | | 5/1998 | Wiedeman | |
| 5,790,071 A | | 8/1998 | Silverstein et al. | 342/354 |
| 5,812,084 A | | 9/1998 | Bonanni et al. | 342/352 |
| 6,150,977 A | | 11/2000 | Wilcoxson et al. | 342/355 |
| 6,288,670 B1 | * | 9/2001 | Villani et al. | 342/354 |

OTHER PUBLICATIONS

Loh, Y.P., "On Antenna Pointing for Communication Satellite", AIAA–92–1940–CP.

* cited by examiner

*Primary Examiner*—Bernarr E. Gregory
*Assistant Examiner*—Fred H. Mull
(74) *Attorney, Agent, or Firm*—Koppel, Jacobs, Patrick & Heybl

(57) ABSTRACT

Methods and structures are provided for reducing pointing errors ζ of satellite antennas and for generating broad field-of-view satellite attitude acquisition patterns. In one method embodiment, satellite transmit beams have estimated pointing attitudes β and are transmitted to overlap on a ground-based receiving terminal which has a known terminal location λ and which measures received signal strengths α. Pointing errors ζ of the transmit beams are then determined from the estimated pointing attitudes β, the terminal location λ and the signal strengths α and the pointing errors ζ are subsequently reduced by revising the pointing attitudes β. Other method embodiments utilize known signal-strength functions and antenna signals with known signal parameters such as frequencies and/or modulations.

27 Claims, 7 Drawing Sheets

SATELLITE METHODS AND STRUCTURES FOR IMPROVED ANTENNA POINTING AND WIDE FIELD-OF-VIEW ATTITUDE ACQUISITION

BACKGROUND OF THE INVENTION

1. Field of the Invention

The present invention relates generally to satellites and, more particularly, to antenna pointing and to wide field-of-view attitude acquisition of satellites.

2. Description of the Related Art

The diagram 20 of FIG. 1A illustrates a satellite 22 that orbits in an orbital plane 24 about the earth 26. The satellite has a satellite body 28 which carries an antenna system 29 and solar panels 30 that generate power for the satellite. Although the satellite's orbital plane 24 may be coplanar with the earth's equatorial plane 32, it is shown more generally as having an inclination 34.

The satellite 22 may be in a synchronous orbit or alternatively, in a nonsynchronous orbit. FIG. 1A illustrates the synchronous alternative by showing the satellite in positions 22A, 22B and 22C at exemplary times $T_O$, $T_O$+6 hours and $T_O$+12 hours. The satellite 22 provides a service (e.g., communication service) to a service area 40 on the earth which is shown in corresponding positions 40A, 40B and 40C.

FIG. 1A also illustrates the nonsynchronous alternative by indicating that the satellites at positions 22B and 22C may be different satellites 36 and 38. In the nonsynchronous alternative, FIG. 1A represents one instant in time (e.g., the time $T_O$) and the satellites 22, 36 and 38 serve respective service areas 40A, 40B and 40C.

FIG. 1B is an enlarged view of the satellite in position 22A. This figure shows that the antenna system 29 of the satellite 22 generates a payload beam 42 which forms a payload footprint 44 on the earth 26. The payload beam generally includes a large number of individual spot beams. In order to enhance the satellite's provided service and reduce the energy needed to provide that service, the payload footprint 44 is preferably coincident with its respective service area. Stated differently, it is important to reduce service error which is any difference between the payload footprint 44 and its respective service area.

The importance of reduced service error has created a need for satellite methods and structures that improve antenna pointing. Sources of error in antenna pointing include mechanical misalignment, thermal deformation, ephemeris error and orbit error. Most systems that improve antenna pointing depend upon sensed signals from attitude references (e.g., sun, stars and earth's horizon). A conventional attitude reference that improves antenna pointing is a beacon ground terminal that radiates a beacon signal. This provides the satellite's receiving antennas with a reference signal from a predetermined terminal location. Beacon systems, however, require additional satellite hardware and the cost of a dedicated beacon terminal.

Accordingly, various alternatives have been proposed. For example, U.S. Pat. No. 3,060,425 radiated a suppressed-carrier, double sideband signal from a plurality of antennas that were arranged transversely to a selected axis of a satellite. These signals were received at an earth-based terminal and demodulated to yield phases and amplitudes indicative of the satellite's attitude with respect to the selected axis. This method requires accurate interferometry equipment and is difficult to implement with conventional communication terminals.

In a method of U.S. Pat. No. 5,790,071, three different phase-shifted pulses, one sum pulse and two delta pulses, are generated on a satellite and transmitted to an earth-based terminal. The delta pulses and sum pulse are used to form two delta-to-sum ratios that indicate relative attitude between the satellite and the terminal. This method requires special phase shift patterns of the antenna which can not be used to generate regular service beams.

U.S. Pat. No. 4,599,619 and U.S. Pat. No. 4,630,058 apply two satellite-generated beacon beams, one regular beam from the satellite communication antenna and one broad beam from a separate antenna that covers a region including and greater than that covered by the regular beam. The beacon beams are received at ground terminals that are positioned near the periphery of the regular beam. Ratios of the regular beam to the broad beam are thereby produced and are used to determine pointing errors of the communication antenna. To practice this method, the satellite must carry the additional antenna and a large number of ground terminals must be appropriately positioned.

A method of U.S. Pat. No. 5,697,050 and U.S. Pat. No. 5,758,260 is directed to a satellite whose antenna generates a moving beam pattern on the earth's surface wherein the beam pattern comprises a plurality of sub-beams. A signal radiated from at least one ground-based transmitter terminal is received with the satellite's antenna and that received signal is retransmitted to the ground terminal. The gain of the received signal is determined at the ground terminal and compared to an expected gain to derive antenna pointing correction signals. This method is restricted to pointing of satellite receiving antennas that have moving beam patterns on the earth's surface.

U.S. Pat. No. 5,812,084 configures a satellite's phased-array antenna in a "straight-through" mode in which all radiating elements radiate with the same amplitude and phase. The antenna's attitude is then estimated based upon straight-through gains measured at two or more receiver sites. Most satellite service beams are, however, not generated in such a "straight-through" mode.

U.S. Pat. No. 4,910,524 oscillates the pointing direction of a satellite transmit beam to produce a periodic or repetitive displacement of a ground pattern, and measuring the resultant oscillatory variation in flux density at a ground station or ground stations to determine the antenna beam pointing errors. For most satellites, however, the addition of a deliberate oscillation of the payload would be an added burden on the satellite, and it is itself another source of antenna pointing error.

U.S. Pat. No. 6,150,977 measures the signal strength of a first spot beam at at least three unique locations on the ground to determine at least one attitude component of the antenna pointing error of a satellite antenna. The requirement that at least three unique ground measurement locations be provided for a single beam is unnecessarily restrictive.

The paper by Loh, "On Antenna Pointing for Communications Satellite" discusses many methods of determining satellite antenna beam pointing, including sun, earth, star and beacon sensors. There is also discussed a system of pointing based on a on-board multiple-beam-antenna (MBA) system. The MBA sensing system processes the magnitudes of signals received from a known uplink site by singlet beams of an on-board MBA system to provide the error for antenna pointing control. Providing good attitude information using this single uplink site taught by Loh requires that position of the uplink site in the singlet beam pattern provides good observability of attitude. Most combinations of uplink site and singlet beam pattern optimized for communication will not have good observability. The current invention addresses this by using multiple uplink sites.

Loh describes three techniques of closed loop control of antenna beam pointing classified under “A.2 On-Ground Sensors”. These are “Ratio of Signals at Various Sites”, “Downlink C/KT’s measured by a Spectrum Analyzer” and “Location Determination Using Singlets of MBA”. However, the first technique simply describes and references the teachings of U.S. Pat. No. 4,630,058, discussed above. The second technique “assumes that the downlink C/KT’s of each FDMA transponder is measured at a ground station by a spectrum analyzer. The ratios of measured C/KT’s to the desired values are used as pointing error for footprint control.”

A system based on this is described in the section “Ground-based Closed-loop Satellite Antenna pointing Control System”, and depicted in FIG. 10 (using four ground sites for one antenna beam), of the Loh paper. Here Loh is teaching a system very similar to that of U.S. Pat. No. 6,150,977, and teaches away from systems using multiple ground sites and multiple antenna beams.

The third technique is to receive the signals from a known uplink site by singlet beams of an on-board multiple-beam antenna (MBA) and to transpond these signals to the ground, where beam pattern databases and processing software reside in a computer on the ground processing center. As in the other MBA system Loh describes, most MBA singlet patterns would have to be modified to provide good observability using a single uplink site.

It is therefore apparent that conventional antenna pointing methods have generally required the addition of substantial processes and structures beyond those required to realize the intended services of satellites or their application has been limited to antennas that generate moving patterns on the earth’s surface.

With respect to satellite attitude acquisition, conventional beacon-based satellite attitude acquisition methods have typically been restricted to narrow fields-of-view because they utilize ground-based beacon signals.

BRIEF SUMMARY OF THE INVENTION

The present invention is directed to methods and structures that reduce pointing errors $\zeta$ of satellite antennas without interrupting the satellite’s service and that provide wide field-of-view satellite attitude acquisition.

In one method embodiment of the invention, a satellite antenna has an estimated attitude $\beta$ and transmits transmit beams that overlap in an overlap region where their gains are decreasing from their respective maximum gains. Neither of these overlapping beams fully covers the region covered by the other beam. At least one ground-based receiving terminal has a known terminal location $\lambda$ within the overlap region and measures received signal strengths $\alpha$ of the transmit beams. Pointing error $\zeta$ of the satellite antenna is then determined from the estimated pointing attitude $\beta$, the terminal location $\zeta$ and the received signal strengths $\alpha$. The pointing error $\zeta$ is subsequently reduced by appropriate revision of the pointing attitude $\beta$.

In another method embodiment, a plurality of ground terminals of known terminal locations $\zeta$ receive signal strengths $\alpha$ from at least one satellite transmit beam that has a known signal-strength function. Pointing error $\zeta$ is determined from the attitude $\beta$, the signal strengths $\alpha$, terminal locations $\lambda$ and the signal-strength function.

In one method embodiment of wide field-of-view attitude acquisition, a plurality of transmit beams are transmitted from a satellite with different respective transmit parameters $P_{tr}$. The satellite is slewed in a search trajectory that sweeps the transmit beams over a ground-based receiving terminal with a search order wherein the receiving terminal has a known terminal location $\lambda$. The transmit beams are identified from their received respective transmit parameters $P_{tr}$ and their received signal strengths $\alpha$ are measured. The satellite attitude is determined from the identified transmit beams, the search order, the terminal location $\lambda$ and the received signal strengths $\alpha$.

The novel features of the invention are set forth with particularity in the appended claims. The invention will be best understood from the following description when read in conjunction with the accompanying drawings.

DETAILED DESCRIPTION OF THE INVENTION

Figure 1A:
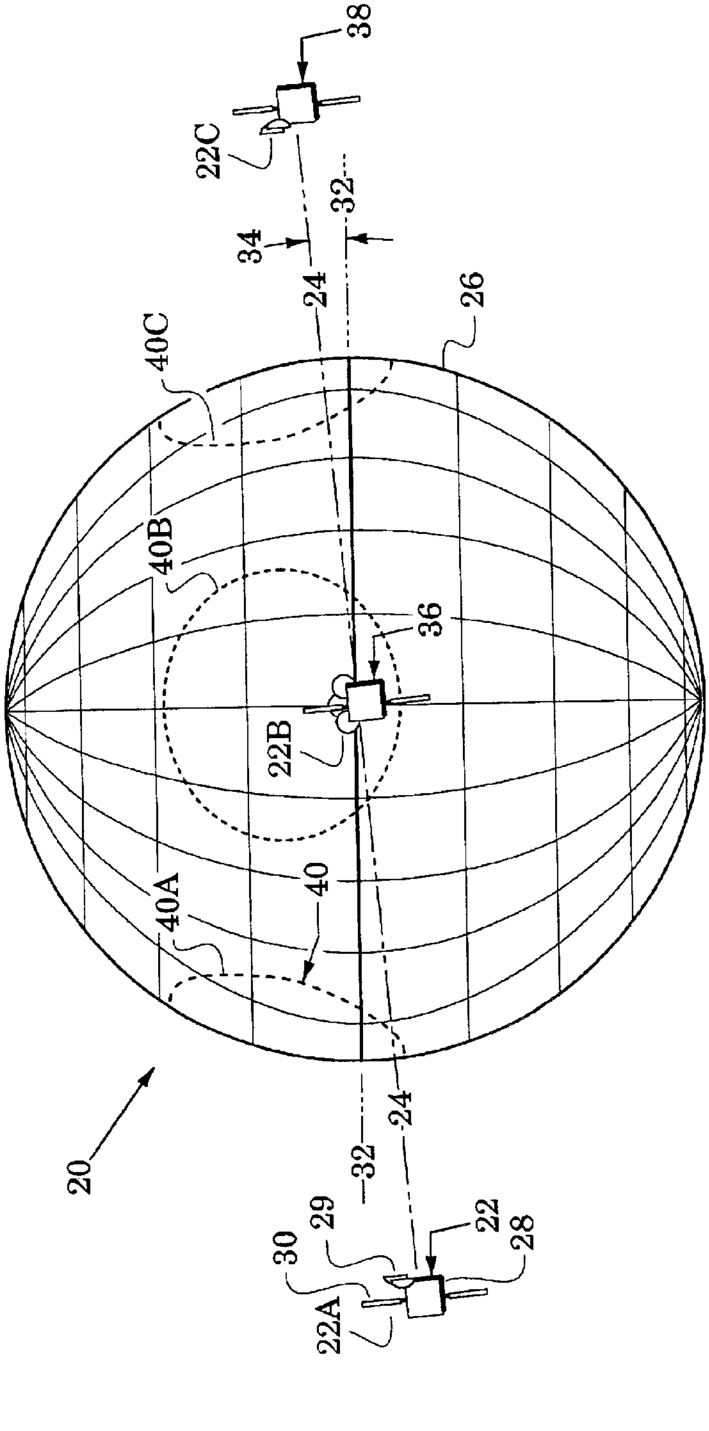
FIG. 1A (PRIOR ART)
FIG. 1A is a view of the earth, a service area on the earth and an orbiting satellite which is intended to provide a service to the service area.
Figure 1B:
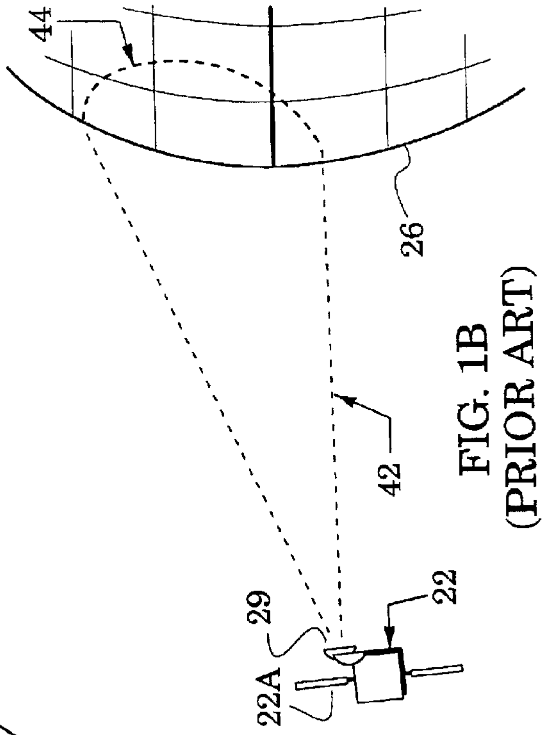
FIG. 1B (PRIOR ART)
FIG. 1B is a side view of FIG. 1A which shows a payload beam and a payload footprint that are generated by the satellite’s antenna system.
Figure 2:
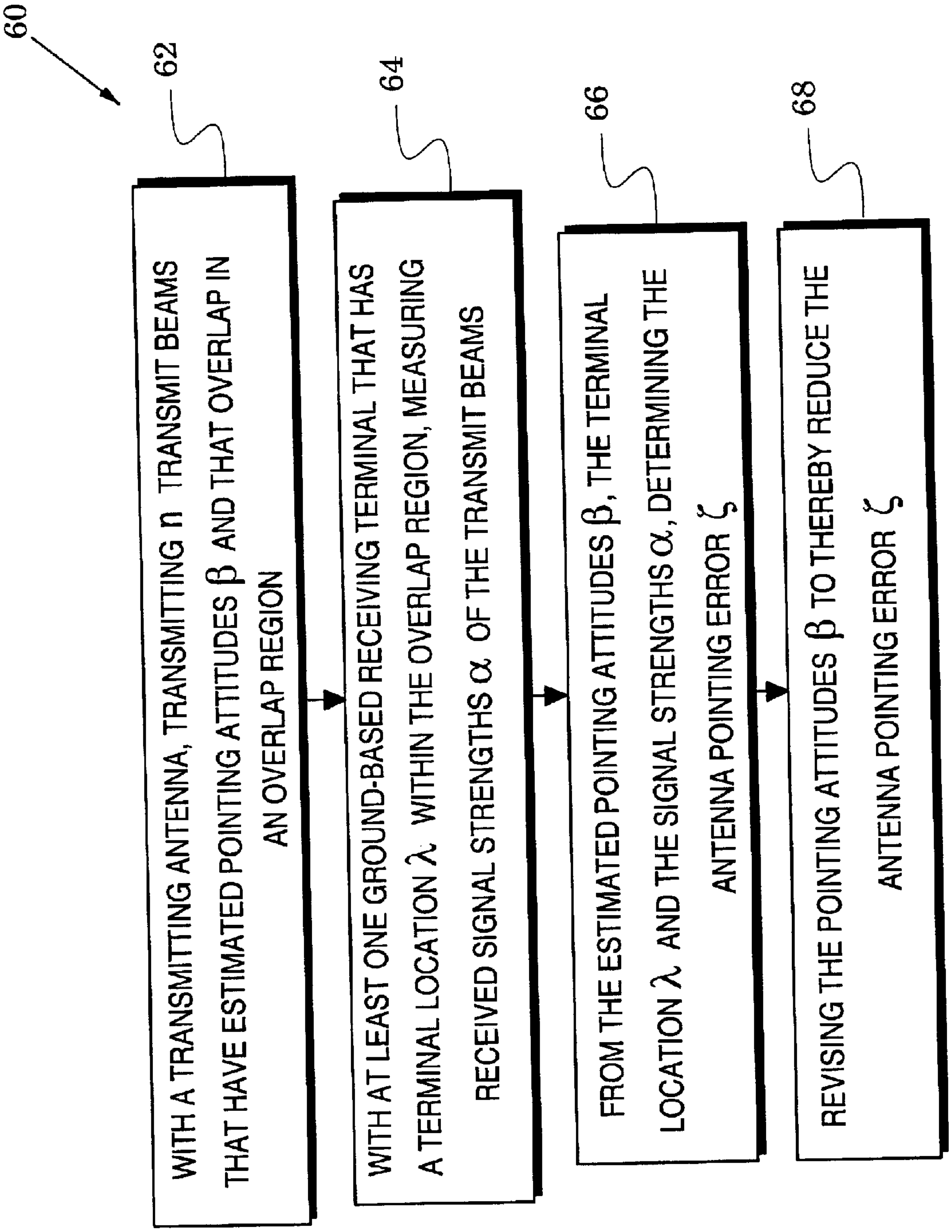
FIG. 2 is a flow chart that illustrates a method embodiment of the invention.

Attention is initially directed to antenna pointing aspects of the invention. The flow chart 60 of FIG. 2, for example, recites process steps that improve antenna pointing. In particular, the method of FIG. 2 is directed to the reduction of pointing errors $\zeta$ of satellite antennas and has a first step 62 in which a transmitting antenna transmits n transmit beams which have estimated pointing attitudes $\beta$ and overlap in an overlap region where their gains are decreasing from their respective maximum gains.

With at least one ground-based receiving terminal that has a terminal location $\lambda$ within the overlap region, received signal strengths $\alpha$ of the transmit beams are measured in process step 64. In process step 66, the pointing error $\zeta$ is determined from the estimated pointing attitude $\beta$, the terminal location $\lambda$ and the signal strengths $\alpha$. Finally, pointing attitude $\beta$ are revised in process step 68 to reduce the determined pointing error $\zeta$. The processes of FIG. 2 are disclosed in greater detail in the following descriptions of FIGS. 3, 4, 5A–5C, 6A and 6B.

Figure 3:
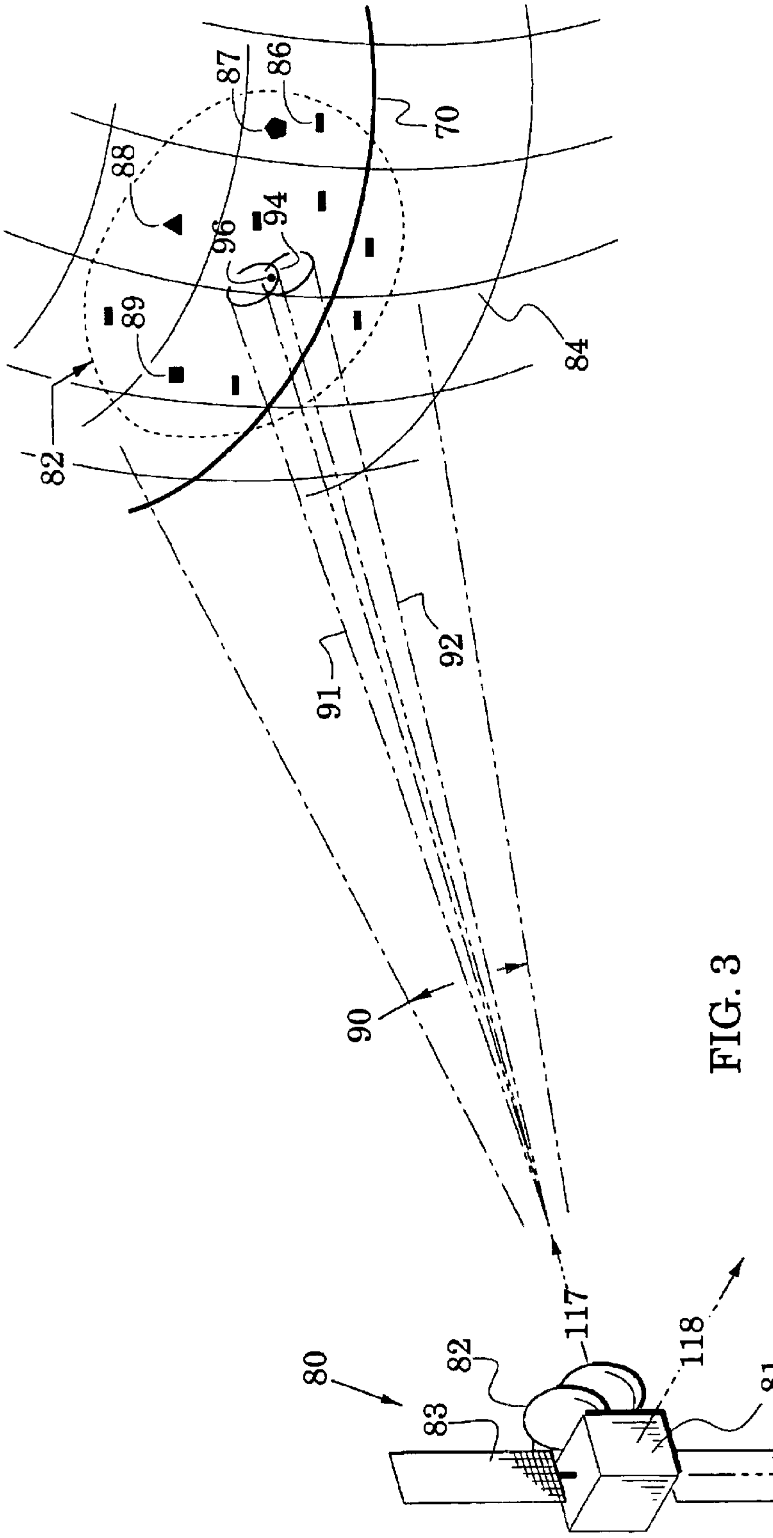
FIG. 3 is a perspective view of FIG. 1A that illustrates the method of FIG. 2.

In FIG. 3, a satellite 80 has a body 81 which carries an antenna system 82 and solar panels 83 that generate power for the satellite. The satellite provides service (e.g., communication service) for terminals in a service area 82 on the earth 84. Exemplary terminals are user terminals 86 (fixed and mobile), a communication gateway 87, a command and control terminal 88 and a satellite-pointing-determination terminal 89.

In particular, the satellite provides service by generating a plurality of communication spot beams (e.g., 91 and 92) that form a combined angular coverage width 90 and a payload footprint on the earth 84 that is preferably coincident with the service area 82. In the exemplary case in which the antenna system 82 is a phased array antenna, each of the spot beams has an associated respective phase shift. In the exemplary case in which the antenna system 82 is a feedhorn-and-reflector antenna system, each of the spot beams is generated by a respective feedhorn.

The satellite 80 of FIG. 3 includes an attitude control system that provides the satellite's estimated antenna pointing attitude $\beta$ of process step 62 of FIG. 2. To realize process step 62, the spot beams 91 and 92 of FIG. 3 are generated so that their footprints overlap in an overlap region 94. As recited in process step 64 of FIG. 2, a terminal 96 is provided with a known terminal location $\lambda$ that is positioned in the overlap region 94 and it measures respective received signal strengths $\alpha$ of the beams 91 and 92.

Figure 4A:
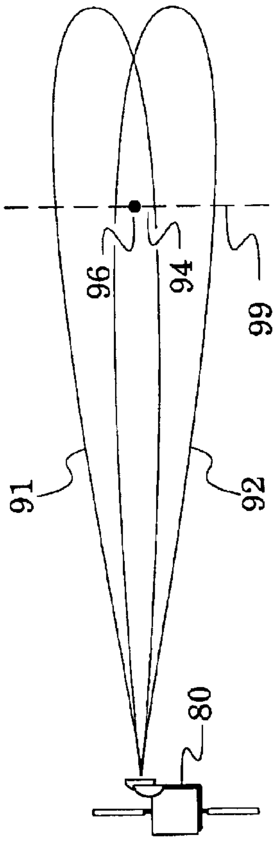
FIG. 4A is a side view of FIG. 3 which illustrates the beam pattern of FIG. 2.

FIG. 4A is a side view of FIG. 3 with a local surface of the earth (84 in FIG. 3) approximated by a broken line 99. The terminal 96 is in the overlap region of the beams 91 and 92. Because the overlap region is spaced from the boresights of the beams 91 and 92, the beam gains are reducing from their maximum gains. Accordingly, angular displacement of the terminal 96 in the overlap region will generate significant changes in the received signal strengths $\alpha$. That is, the received signal strengths $\alpha$ are quite sensitive to angular displacement in the overlap region 94.

In general, the received signal strengths $\alpha$ are described by $$\alpha=\eta P(\beta,\zeta,\lambda) \tag{1}$$

in which $\eta$ is local attenuation of the signal strength at location $\lambda$ and $P(\cdot)$ is a function that defines the spot beam shape in terms of estimated pointing attitude $\beta$, pointing error $\zeta$ and terminal location $\lambda$. Because the estimated pointing attitude $\beta$ and the terminal location $\lambda$ are known and the shape function $P(\cdot)$ is predetermined, a data processor on the satellite 80 or the earth 84 can generate predicted signal strengths at the terminal 96 for each of the beams 91 and 92.

In particular, the local attenuation $\eta$ is not known but it is substantially constant in the vicinity of the terminal 96 so that comparisons or ratios of the received signal strengths $\alpha$ contain the requisite information on angular displacement between the actual beam locations and the terminal location $\lambda$. In accordance with process step 66 of FIG. 2, therefore, the terminal 96 can measure the received signal strengths $\alpha$ and determine the pointing error $\zeta$ on the basis of differences between predicted signal strengths (from the known pointing attitude $\beta$, terminal location $\lambda$ and shape function $P(\cdot)$) and the received signal strengths $\alpha$.

Satellite antenna boresight pointing errors $\zeta$ can generally be defined by two angular errors, roll error angle $\zeta_r$ and pitch error angle $\zeta_p$. While rotational pointing errors around the direction of the antenna boresight ("yaw errors") are generally of lesser importance than roll and pitch errors, they can also be solved for if sufficient data is available, most obviously if measurements from two widely separated ground stations is available.

Figure 4B:
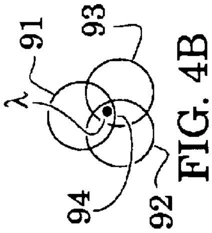
FIG. 4B is a plan view of another beam pattern that may be used in the method of FIG. 2.

Obtaining accurate measures of both $\zeta_r$ and $\zeta_p$ requires at least three antenna beams with overlapping footprints wherein the terminal location $\lambda$ is positioned in the overlap region. FIG. 4B, for example, shows that spot beams 91 and 92 and a third spot beam 93 overlap to form an overlap region 94 which contains the terminal location $\lambda$. To determine pointing errors $\zeta$, the terminal at location $\lambda$ measures signal strengths $\alpha_1$, $\alpha_2$ and $\alpha_3$ of the three spot beams. In accordance with relationship (1) above, the pointing errors $\zeta$ and attenuation $\eta$ are determined from relationships $$\alpha_1=\eta P(B_1,\zeta,\lambda),\ \alpha_2=\eta P(\beta_2,\zeta,\lambda)\ \text{and}\ \alpha_3=\eta P(\beta_3,\zeta,\lambda) \tag{2}$$

which are sufficient to determine attenuation $\eta$, roll error angle $\zeta_r$ and pitch error angle $\zeta_p$.

Preferably at least three overlapped spot beams such as those of FIG. 4B are transmitted as they are sufficient to determine the pointing errors. Additional spot beams, however, further simplify the determination.

Figure 5A:
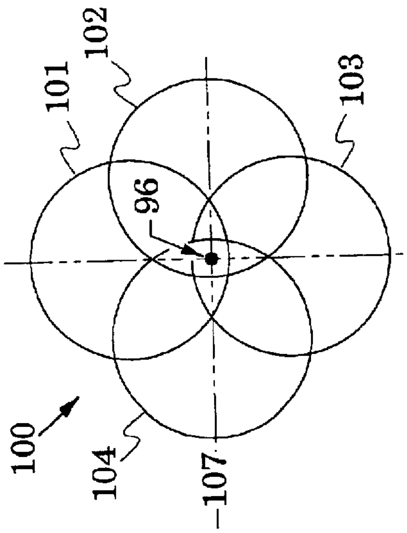
FIGS. 5A–5D are diagrams of other beam patterns that may be used in methods of the invention.

For example, FIG. 5A illustrates a beam pattern 100 that comprises four overlapped communication spot beams 101, 102, 103 and 104 associated with broken lines 106 and 107 which have north-south and east-west orientations. A terminal location 96 is in the overlap region of these beams. Signal strengths ox of these beams can be organized in relationships $$\frac{\alpha_{101}-\alpha_{103}}{\alpha_{101}+\alpha_{103}}=q_r(\beta_r,\zeta_r,\lambda),\ \frac{\alpha_{102}-\alpha_{104}}{\alpha_{102}+\alpha_{104}}=q_p(\beta_p,\zeta_p,\lambda) \tag{3}$$

in which $\beta_r$ and $\beta_p$ are estimated roll and pitch antenna pointing attitudes and $q_r$ and $q_p$ are roll and pitch functions of antenna pointing. The pointing errors $\zeta_r$ and $\zeta_p$ can be easily determined from these two equations.

In the prior example, beams 101, 102, 103 and 104 are contiguous and all observable from the single station 96. However, the pointing can be similarly determined by equation (3) even if beams 102 and 104 overlap only each other and not beams 101 and 103. This can be accomplished by using a second station in the overlap region of beams 102 and 104 to measure the signal strengths of 102 and 104.

It is not necessary that the centers of the overlap regions be aligned with the north-south and east-west axes. As long as the lines of the centers of the overlap regions are along linearly independent directions, the computations of the left hand sides of equation (3) will compute linearly independent beam errors. If the lines are not north-south and east-west, these linearly independent beam errors will not be the pure roll and pitch errors, but linear combinations of roll and pitch. However, the roll and pitch errors can be simply extracted by solving two equations in two unknowns. If there are more than two sets of overlapping beam measurements, then the yaw error can be calculated as well, and/or least squares or Kalman filter techniques can be used to form an improved estimate of roll and pitch.

A data processor on the satellite 80 or the earth 84 can therefore carry out process step 66 of FIG. 2 to determine the pointing errors $\zeta_r$ and $\zeta_p$. In response to this error, the attitude control system or the antenna control system of the satellite can change at least one of satellite attitude or antenna pointing attitude with respect to the satellite (e.g., via an antenna positioning mechanism or via revised beam phase shifts if a phased array antenna is involved) as indicated by process step 68 of FIG. 2.

Figure 5B:
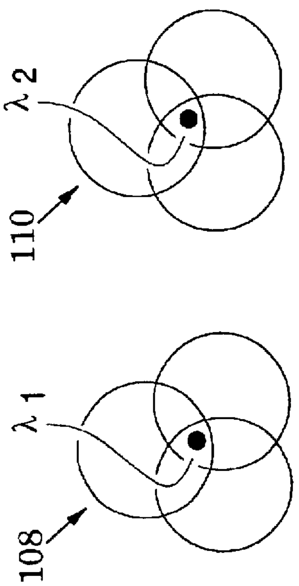

Yaw antenna pointing errors (pointing error along the antenna boresight) can be determined by utilizing a second set of overlapped spot beams that is spaced from a first set. FIG. 5B, for example, illustrates a first set 108 of overlapped communication spot beams and a second set 110 that is angularly spaced from the first set. Terminal locations $\lambda_1$ and $\lambda_2$ are positioned respectively within the overlap regions of the first and second sets. Because these sets are angularly spaced, they generate pointing error $\zeta$ information which can be resolved into a yaw error component $\zeta_y$.

Figure 6B:
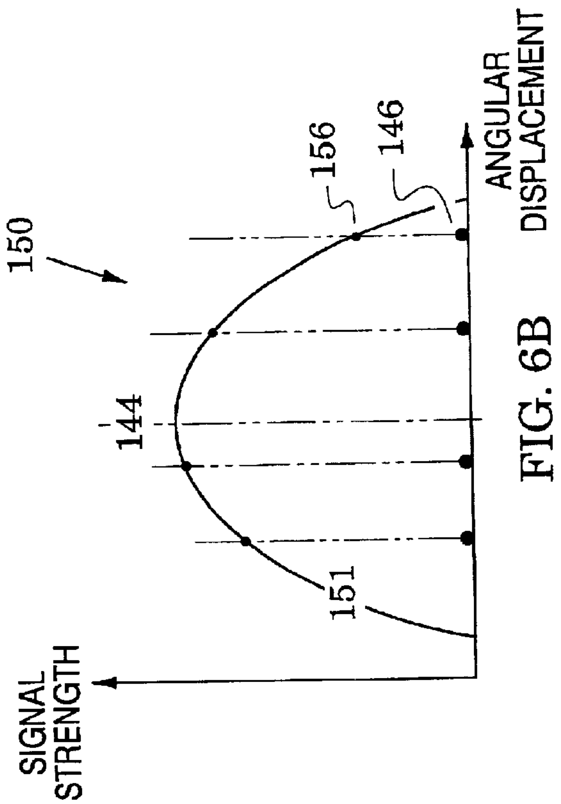
FIGS. 6A and 6B are diagrams of beam signal strengths as functions of angular displacement in the beam patterns of FIGS. 5A and 5C.
Figure 6A:
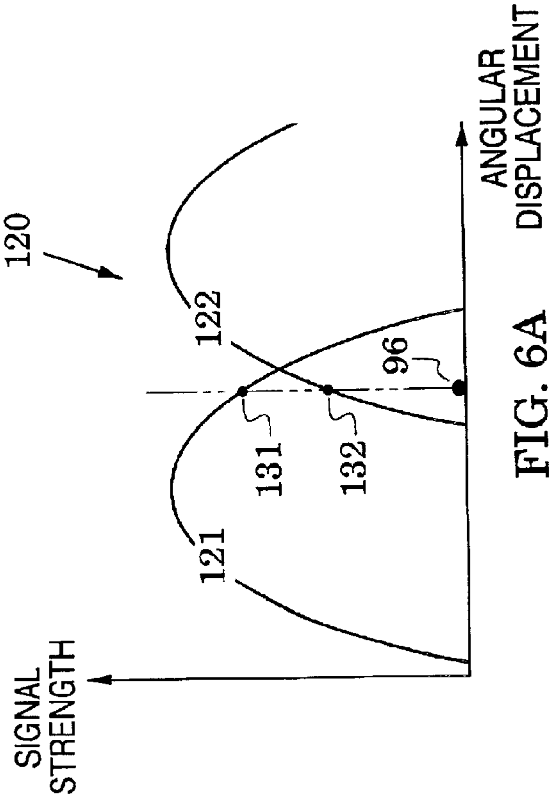

FIG. 6A is a plot 120 of signal strengths 121 and 122 respectively of the spot beams 91 and 92 of FIG. 4B as a function of angular displacement. It is noted that the terminal 96 is in an overlap region where the gains of the spot beams are reducing from their maximum gains. The terminal 96 will thus realize respective received signal strengths 131 and 132 which indicate angular displacement of the beams 91 and 92 relative to the terminal 96. It is noted that the terminal locations $\lambda$ of many of the ground terminals (e.g., the communication gateway 87) of FIG. 3 can be predetermined. For others (e.g., mobile user terminals 86), their terminal location $\lambda$ can be determined with the aid of signals from the global positioning system (GPS).

In an transmit embodiment of the invention, the estimated pointing attitude $\beta$, the terminal location $\lambda$ and the signal strengths $\alpha$ are communicated to a ground terminal (e.g., the satellite-pointing-determination terminal 89 of FIG. 3) where the pointing error $\zeta$ is determined and subsequently uplinked to the satellite via its antenna system (82 in FIG. 3) for cancellation of the pointing error $\zeta$. This process may be facilitated by characterizing the pointing error $\zeta$ in a suitable form (e.g., a Fourier series). In another embodiment, the signal strengths $\alpha$ are uplinked to the satellite and the pointing error $\zeta$ is determined at the satellite.

To illustrate a reduction of the pointing error $\zeta$ of satellite receiving antennas, beams such as beams 101–104 of FIG. 5A may be considered to be receive beams (i.e., they represent reception gains of the satellite's antenna system (82 in FIG. 3). The terminal 96 of FIG. 5A, for example, now transmits a transmit signal and received signals strengths $\alpha$ are measured on the satellite (80 in FIG. 3). Preferably, no more than two receive beams are measured from at least one of the transmit terminals. If it has not been predetermined, the terminal location $\lambda$ is uplinked to the satellite and the pointing error $\zeta$ is determined at the satellite. Alternatively, the received signals strengths $\alpha$ are downlinked to the ground terminal where the pointing error $\zeta$ is determined.

Greater numbers of ground terminals are generally required to determine pointing errors with single or multiple communication beams when no terminal location $\lambda$ is positioned within an overlap region. In particular, ground terminals are required that have terminal locations $\lambda$ within skirt regions of the single or multiple beams where gains are reducing from their maximum gains.

Figure 5C:
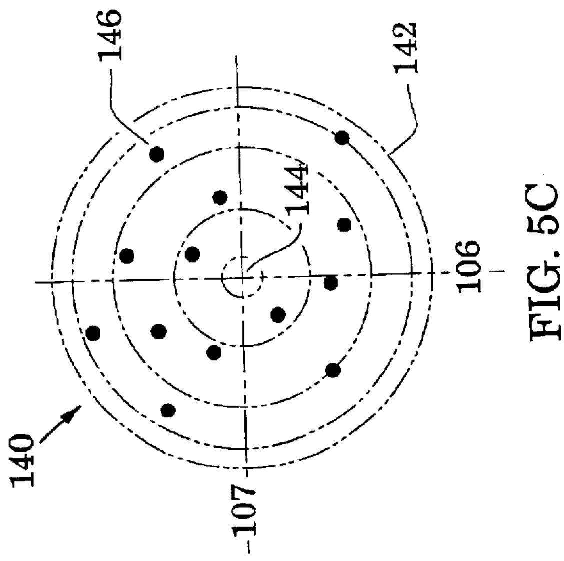

For example, the diagram 140 of FIG. 5C illustrates footprints 142 of a single transmitted communication beam wherein the footprints define different beam gains (e.g., −1 dB, −3 dB, −6 dB and so on) that reduce from a maximum beam gain at the beam boresight 144 which is at the intersection of north-south and east-west lines 106 and 107. A plurality of terminal locations 146 are positioned in the skirt regions of the beam and, accordingly, they measure signal strengths $$\alpha_i=\eta_i P(\beta,\zeta,\lambda_i) \quad (4)$$

wherein $\eta_i$ denotes local attenuations at respective locations $\lambda_i$.

Although signal-strength relationships (4) contain more unknowns than relationships, the invention addresses the attenuation $\eta$ as a random factor that perturbs the measured signal strengths and thereby determines the pointing error $\zeta$ by fitting the measured signal strengths $\alpha_i$ with the beam shape function $P(\cdot)$.

FIG. 6B is a plot 150 of signal strength 151 that corresponds to the footprints 142 of FIG. 5C that are concentric about the beam boresight 144. As shown, each of the terminals 146 of FIG. 5C will realize a respective signal strength 156.

Figure 5D:
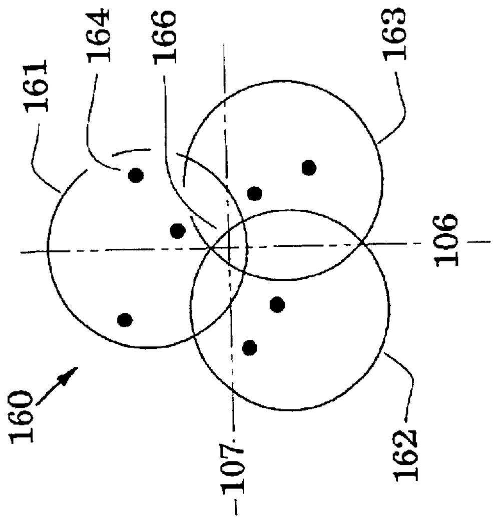

FIG. 5D illustrates a beam pattern 160 that comprises overlapped spot beams 161, 162 and 163 which are generated by a multiple-beam antenna but wherein all of the terminal locations 164 are outside an overlap region 166. An i-th terminal within the spot beam 161 measures received signal strengths $\alpha_{161,i}=\eta_{161,i}P_{161}(\beta_{161},\zeta,\lambda_{161,i})$, a j-th terminal within the spot beam 162 measures received signal strengths $\alpha_{162,j}=\eta_{162,j}P_{162}(\beta_{162},\zeta,\lambda_{162,j})$, and a k-th terminal within the spot beam 163 measures received signal strengths $\alpha_{163,k}=\eta_{163,k}P_{163}(\beta_{163},\zeta,\lambda_{163,k})$. The invention addresses the attenuation factors $\eta_{161}$, $\eta_{162}$ and $\eta_{163}$ as random factors that perturb the measured signal strengths and thereby determines the pointing error $\zeta$ by fitting beam shape functions $P_{161}(\cdot)$, $P_{162}(\cdot)$ and $P_{163}(\cdot)$ to the measured signal strengths $\alpha_{161}$, $\alpha_{162}$ and $\alpha_{163}$.

A large number of terminals are preferably included in order to enhance the error accuracy. Exemplary terminals are hand held telephones which typically contain GPS receivers to facilitate billing processes and which generally transmit their positions to satellites to facilitate selection of advantageous communication frequencies.

It is noted that the teachings of the invention may be used to determine pointing errors $\zeta$ of satellite transmitting antennas when beam footprints (e.g., those of FIGS. 5A–5D) are generated by a satellite transmitter system, Alternatively, these teachings may be used to determine pointing errors $\zeta$ of satellite receiving antennas when the beam footprints are generated by a satellite receiver system.

In transmitting-antenna applications of these latter embodiments of the invention, the estimated pointing attitudes $\beta$, the terminal location $\lambda$ and the signal strengths $\alpha$ received at ground terminals (that are positioned in beam skirt regions) are communicated to at least one ground terminal (e.g., the satellite-pointing-determination terminal 89 of FIG. 3) where the transmitting-antenna pointing error $\zeta$ is determined and subsequently uplinked to the satellite via its antenna system (82 in FIG. 3). In another embodiment, the received signal strengths $\alpha$ are uplinked to the satellite and the transmitting-antenna pointing error $\zeta$ is determined at the satellite.

In receiving-antenna applications, the estimated pointing attitudes $\beta$, the terminal location $\lambda$ and the signal strengths $\alpha$ received at the satellite (from ground terminals that are positioned in beam skirt regions) are downlinked to at least one ground terminal (e.g., the satellite-pointing-determination terminal 89 of FIG. 3) where the receiving-antenna pointing error $\zeta$ is determined and subsequently uplinked to the satellite via its antenna system (82 in FIG. 3). In another embodiment, the received signal strengths $\alpha$ are used in the satellite for determination of the receiving-antenna pointing error $\zeta$.

Figure 7:
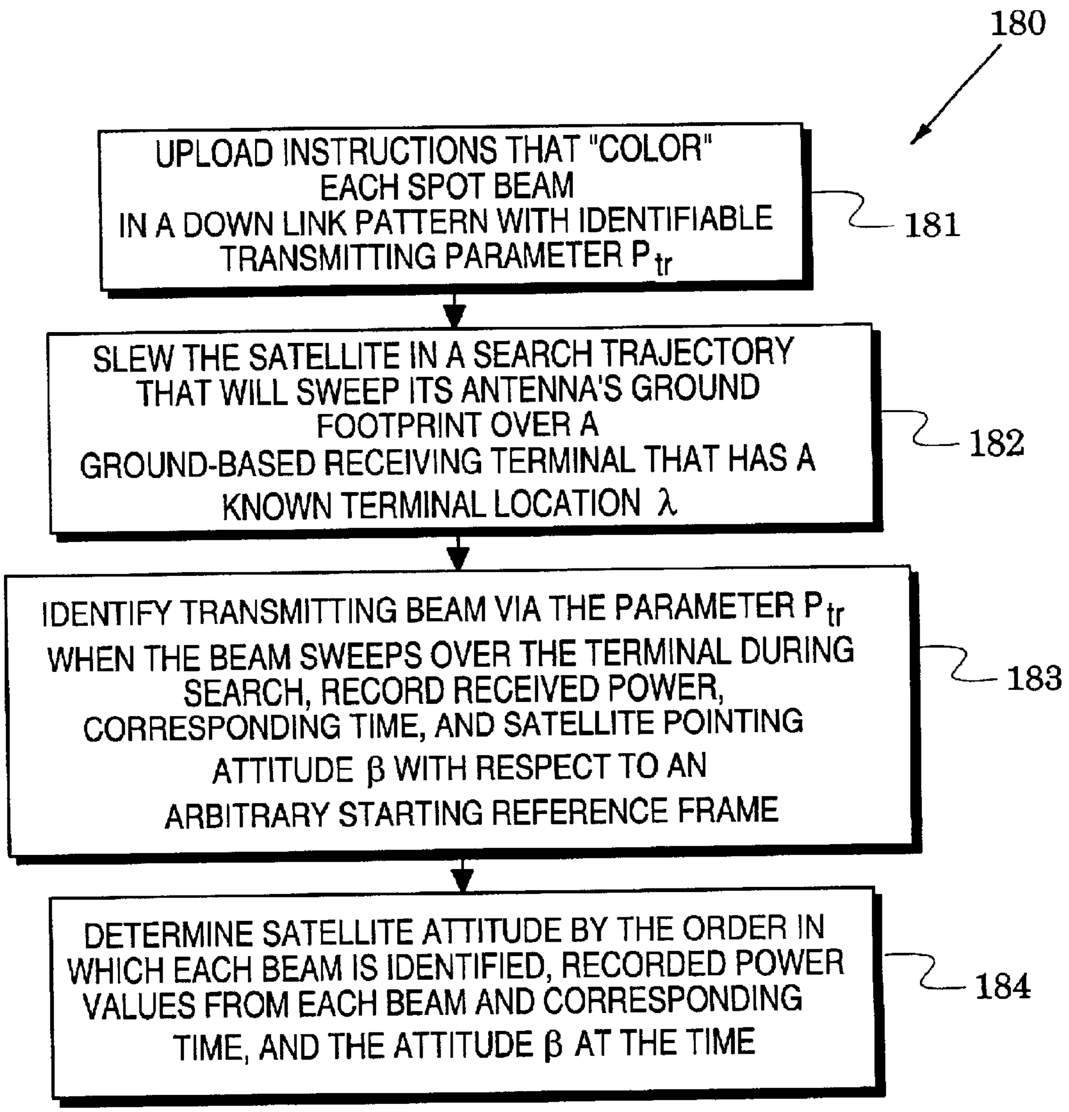
FIG. 7 is a flow chart that illustrates another method embodiment of the invention.

Attention is now directed to the flow chart 180 of FIG. 7 which illustrates a wide field-of-view attitude acquisition method of the invention. In a first process step 181 of this method, an upload transmission is sent to the satellite (80 in FIG. 3) with instructions that "color" each spot beam in a downlink pattern with identifiable transmit parameters $P_{tr}$ (e.g., different frequencies and/or different modulations such as amplitude, code or frequency).

In a second process step 182, the satellite is slewed in a search trajectory that will sweep its antenna's ground footprint over a ground-based receiving terminal that has a known terminal location λ. The receiving terminal identifies the transmit beams in process step 183 from their respective transmit parameters $P_{tr}$ when these beams sweep over the terminal during the search slew. The receiving terminal also records the identification time, received beam power, and the satellite pointing attitude β with respect to an arbitrarily selected starting reference frame.

Because the satellite's search trajectory is known, its roll and pitch attitude can be determined in process step 184 by the order in which each of the beams sweep over the terminal, the corresponding identification time, received power and the pointing attitude β.

If it is desired to determine satellite attitude more accurately, the satellite is slewed again to position the receiving terminal in an overlap region of at least two transmit beams. The slew is stopped at this time and received signal strengths α of the transmit beams are measured. The satellite attitude is accurately determined from the estimated satellite pointing attitude β, the known terminal location λ and the signal strengths α.

It is noted that the teachings of the invention on satellite attitude acquisition may also be practiced with satellite receive antennas wherein ground-based terminals generate "colored" signals.

Figure 8:
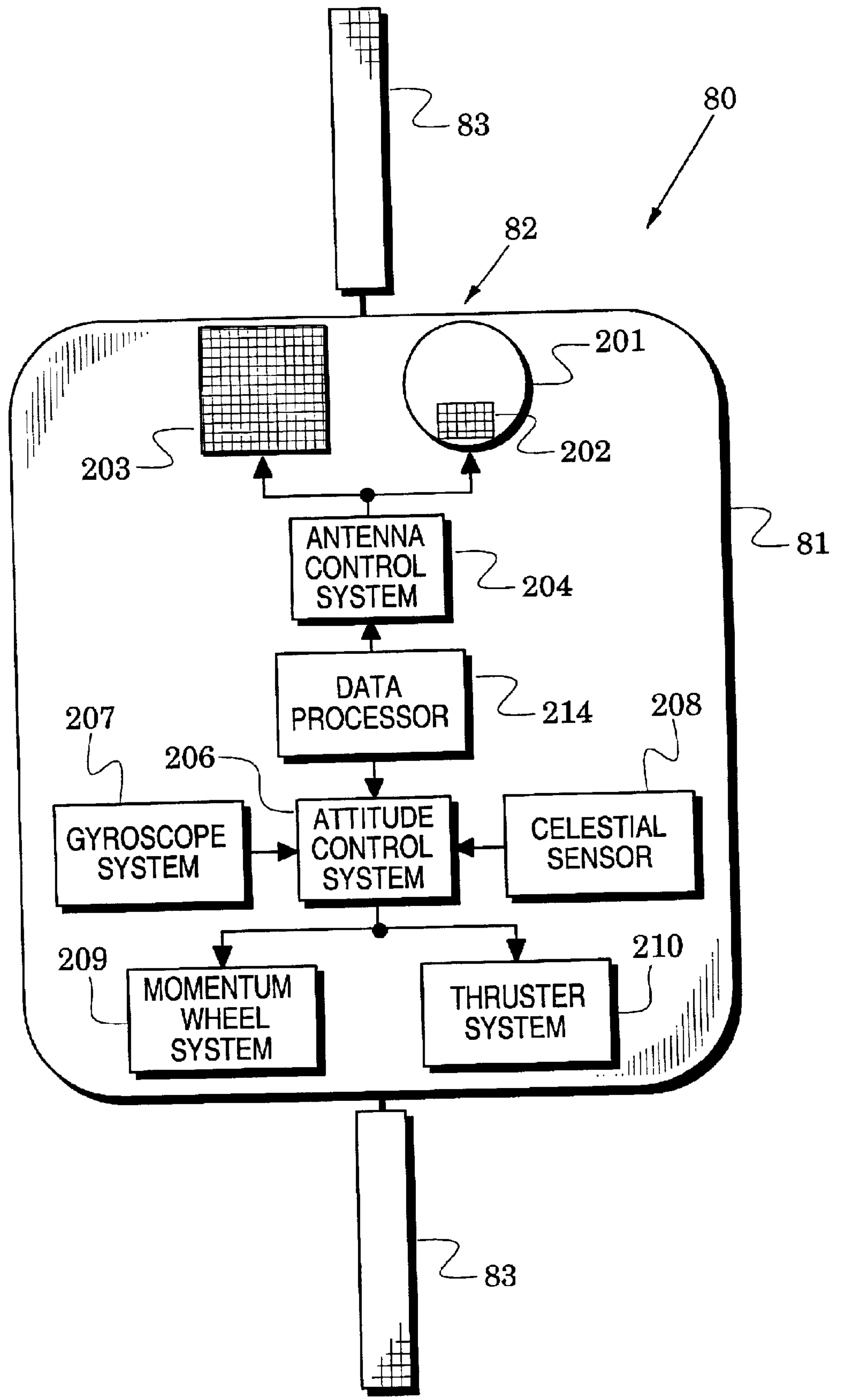
FIG. 8 is a front view of a satellite that practices the methods of the invention.

Methods of the invention may be practiced with the satellite 80 of FIG. 4 which is shown in greater detail in FIG. 8. In particular, the satellite includes a body 81 that carries an antenna control system 204, an attitude control system 206, a data processor 214 and solar panels 83 that provide power for these systems. The body also carries an antenna system 82 that responds to the antenna control system 204. In one satellite embodiment, the antenna system is formed with a plurality of elements 202 (e.g., feedhorns) and associated reflectors 201 and the antenna beams are steered with an antenna positioning mechanism. In another antenna embodiment, the antenna system is formed with a phase array antenna 203 and the antenna beams are steered by changing the phases associated with the array elements.

The attitude control system 206 receives attitude and attitude rate sense signals from attitude sensors such as a gyroscope system 207 and celestial sensors 208 (e.g., sun sensor, star sensor) and controls satellite attitude by inducing torques in the body 81 with torque generators such as a momentum wheel system 209 and a thruster system 210. The attitude control system provides the satellite's estimated attitude. The data processor 214 may be one or more processors in systems of the satellite (e.g., in the attitude control system 206) and is programmed to perform the methods that have been described above.

The teachings of the invention can generally be practiced with the same antenna beams (e.g., communication spot beams) that provide service to a service area (e.g., the service area 82 of FIG. 3).

It is well known that antennas operate in accordance with the reciprocity theorem which states that the transmitting and receiving patterns of an antenna are the same. Accordingly, it is intended that antenna-related terms of the invention (e.g., payload beam, spot beams and beam footprint) are not restricted but apply to transmitting or receiving functions as determined by the context in which they appear. It is further noted that antenna beam footprints are portions of the earth's surface over which a satellite antenna system delivers (or receives) a specified signal strength.

Attitude acquisition of beacon-based satellites has conventionally been realized with the aid of ground-based beacon signals. Acquisition with these systems is, however, limited to a field-of-view that is substantially less than those in methods of the present invention.

An exemplary prior art system using conventional beacon transmitters for satellite pointing is currently operating on a mobile phone satellite. It uses two dedicated radio transmitters on the ground. On the satellite, for each beacon, there is a dedicated group of four slightly displaced receive beams arranged in a pattern similar to FIG. 5A, with the quatrefoil pattern of receive beams 101, 102, 103, 104 pointed so as to surround the beacon site 96. The relative strength of the signals from beacon site 96, as measured by receive beams 101, 102, 103 and 104, are used to determine the satellite pointing. The pointing error is not computed unless all four of the receive beams 101, 102, 103, 104 are receiving the beacon signal.

A single beacon signal provides enough information to determine two pointing errors transverse to the beacon. The second beacon signal, from a site at a considerable distance from the first, and "colored" with a pseudorandom code so that it cannot be mistaken for the first, provides similar information, and allows determination of any rotational error, or "yaw" about the line of the first beacon. The allowable pointing error for a valid beacon signal is less than a degree, and the initial attitude acquisition of the satellite was accomplished with a separate earth sensor and sun sensor to bring the satellite within about 5 degrees of the final attitude. The satellite was then slewed using gyroscopes for navigation to within the beacon validity range for final acquisition. The beacon sites have no other purpose than to serve as pointing references for the satellite, and are expensive to maintain.

In contrast, this same exemplary prior art system communicates simultaneously with as many as 10,000 mobile phones through a pattern of hundreds of circular overlapping communication beams on four frequency sets. Each mobile phone, paid for and maintained by its user, contains a GPS receiver and transmits its position to the satellite for billing purposes. Each phone also contains signal measurement circuitry to measure the reception strength of the four frequency sets, and transmits information of which set is strongest to the satellite so the satellite can transmit to it on the appropriate frequency.

This prior art system described above is well suited to be modified to embody one aspect of the current invention. The modification would be to update the mobile phone firmware change to transmit the values of the four frequency signal strengths in addition to the GPS location. This modification would provide the satellite with thousands of data points to determine its pointing. The satellite processing on the ground, or the ground processing, could then be modified per the current invention to convert this new data into pointing corrections.

Even though the individual measurements would be of low quality due to the small and randomly pointed antennas of the cellular phones, and many, or even most mobile phones would able to lock onto only one or two of the frequency sets at a given time, the quantity of data would make up for the poor quality, and the satellite pointing would not need to rely on two expensive and vulnerable dedicated beacon stations.

Similarly, for initial attitude acquisition, the composite field of the hundreds of communication beams on the existing prior art system is actually wider than the earth sensor field of view. The prior art system could be modified to embody a second aspect of the current invention. To acquire the satellite attitude, the satellite communication beam pattern could be slewed about the sunline in a cone whose half-angle was the distance between the sun and a ground station as viewed from the satellite. The operation of the prior art satellite would be modified such that each of the hundreds of transmit beams could be set to transmit a different pattern (in amplitude, frequency, or code), and the patterns versus time, and their signal strength, received at the ground station as they swept over it, providing more than enough information to determine where the ground station lay in satellite pointing frame propagated onboard the satellite by the satellite gyroscopes. The operation of the ground station would be modified to record these signals, and to compute the necessary pointing updates to the satellite to acquire the desired orientation.

Alternatively, for acquisition, a ground station could transmit, and prior art satellite operation could be modified so that it would transpond through it's omnidirectional antenna the receive beam signal strengths to the ground. Because of the time-of-flight delays in the system, and the delays introduced by typical telemetry formatting and ground processing, it is useful to time-tag the data for correct interpretation when the data is actually analyzed. The ground station operation of the prior art system would then be modified to compute the necessary pointing updates to the satellite to acquired the desired orientation from this data. This modification to the prior art system provides a means to acquire attitude if it is ever necessary and the earth sensor has failed. In other applications, it could make the earth sensor (which costs hundreds of thousands of dollars) unnecessary.

The embodiments of the invention described herein are exemplary and numerous modifications, dimensional variations and rearrangements can be readily envisioned to achieve an equivalent result, all of which are intended to be embraced within the scope of the appended claims.

We claim:

1. A method of reducing pointing error ζ of a satellite transmit antenna, comprising the steps of:

with a satellite transmit antenna that has an estimated pointing attitude β, transmitting at least one pair of transmit beams that overlap in an overlap region wherein neither transmit beam covers the entire region covered by the other;

with a ground-based receiving terminal that has a known terminal location λ within said overlap region, measuring received signal strengths α of said transmit beams;

from said estimated pointing attitude β, said terminal location λ and said received signal strengths α, determining said pointing error ζ of said transmit beams; and revising said pointing attitude β to reduce said pointing error ζ.

2. The method of claim 1, wherein said transmit beams comprise four transmit beams.

3. The method of claim 1, wherein said transmit beams comprise first and second transmit beams that are substantially aligned in a north-south direction and third and fourth transmit beams that are substantially aligned in an east-west direction.

4. The method of claim 1, wherein said determining step includes the steps of:

from said estimated pointing attitude β and said terminal location λ, providing predicted signal strengths; and comparing said received signal strengths α and said predicted signal strengths to determine said pointing error ζ.

5. The method of claim 1, wherein said determining step includes the steps of:

resolving said pointing error ζ at an earth-based station; and uplinking said pointing error ζ to said satellite.

6. The method of claim 1, wherein said determining step includes the steps of:

transmitting said signal strengths α to said satellite; and resolving said pointing error ζ at said satellite.

7. The method of claim 1, wherein said revising step includes the step of altering the pointing attitude of said transmit antenna relative to said satellite.

8. The method of claim 1, wherein said revising step includes the step of altering transmit phases of elements of said transmit antenna.

9. The method of claim 1, wherein said revising step includes the step of altering the attitude of said satellite.

10. A method of reducing pointing error ζ of a satellite transmit antenna, comprising the steps of:

with a satellite transmit antenna that has an estimated pointing attitude β, transmitting at least three transmit beams that overlap in an overlap region where their gains are decreasing from their respective maximum gains;

with a ground-based receiving terminal that has a known terminal location λ within said overlap region, measuring received signal strengths α of said transmit beams;

from said estimated pointing attitude β, said terminal location λ and said received signal strengths α, determining said pointing error ζ of said transmit beams; and revising said pointing attitude β to reduce said pointing error ζ.

11. The method of claim 10, wherein said transmit beams comprise four transmit beams.

12. The method of claim 10, wherein said transmit beams comprise first and second transmit beams that are substantially aligned in a north-south direction and third and fourth transmit beams that are substantially aligned in an east-west direction.

13. The method of claim 10, wherein said determining step includes the steps of:

from said estimated pointing attitude β and said terminal location λ, providing predicted signal strengths; and comparing said received signal strengths α and said predicted signal strengths to determine said pointing error ζ.

14. The method of claim 10, wherein said determining step includes the steps of:

resolving said pointing error ζ at an earth-based station; and uplinking said pointing error ζ to said satellite.

15. The method of claim 10, wherein said determining step includes the steps of:

transmitting said signal strengths α to said satellite; and resolving said pointing error ζ at said satellite.

16. The method of claim 10, wherein said revising step includes the step of altering the pointing attitude of said transmit antenna relative to said satellite.

17. The method of claim 10, wherein said revising step includes the step of altering transmit phases of elements of said transmit antenna.

18. The method of claim 10, wherein said revising step includes the step of altering the attitude of said satellite.

19. A method of reducing pointing error ζ of a satellite transmit antenna, comprising the steps of:

with a satellite transmit antenna that has an estimated pointing attitude β, transmitting a set of transmit beams that have skirt regions where their gains decrease from their maximum gains wherein none of said transmit beams in said set of transmit beams has a coverage region including and greater than that of another of said transmit beams in said set of transmit beams;

with a set of ground-based receiving terminals that have terminal locations λ within said skirt regions, measuring received signal strengths α of said transmit beams wherein no more than two terminals in said set of ground-based receiving terminals measures said signal strengths α of any single transmit beam in said set of transmit beams;

based on said received signal strengths α from said set of ground-based receiving terminals, determining said pointing error ζ of said transmit antenna; and revising said pointing attitude β to reduce said pointing error ζ.

20. The method of claim 19, wherein said receiving terminals comprise at least three receiving terminals.

21. The method of claim 19, wherein said receiving terminals comprise at least four receiving terminals.

22. The method of claim 19, wherein said determining step includes the steps of:

from said estimated pointing attitude β and said terminal locations λ, providing respective predicted signal strengths; and comparing said received signal strengths α and said predicted signal strengths to determine said pointing error ζ.

23. The method of claim 19, wherein said determining step includes the steps of:

resolving said pointing error ζ at an earth-based station; and uplinking said pointing error ζ to said satellite.

24. The method of claim 19, wherein said determining step includes the steps of;

transmitting said signal strengths α to said satellite; and resolving said pointing error ζ at said satellite.

25. The method of claim 19, wherein said revising step includes the step of altering the pointing attitude of said transmit antenna relative to said satellite.

26. The method of claim 19, wherein said revising step includes the step of altering transmit phases of elements of said transmit antenna.

27. The method of claim 19, wherein said revising step includes the step of altering the attitude of said satellite.

* * * * *